United States Patent [19]
Bones et al.

[11] Patent Number: 5,230,968
[45] Date of Patent: Jul. 27, 1993

[54] ELECTROCHEMICAL CELLS

[75] Inventors: Roger J. Bones, Abingdon; David Teagle, Swindon; Marion R. Rance, Abingdon, all of England; Johan Coetzer, Pretoria, South Africa; James H. Duncan, Stafford, England

[73] Assignee: Programme 3 Patent Holdings, Luxembourg

[21] Appl. No.: 699,810

[22] Filed: May 13, 1991

[30] Foreign Application Priority Data

May 16, 1990 [GB] United Kingdom ............... 9011035
Aug. 7, 1990 [GB] United Kingdom ............... 9017284

[51] Int. Cl.$^5$ ............................................. H01M 6/18
[52] U.S. Cl. ................................. 429/191; 429/104; 429/139; 429/208
[58] Field of Search ............ 429/191, 193, 208, 139, 429/188, 189, 104; 204/421

[56] References Cited

U.S. PATENT DOCUMENTS

| | | |
|---|---|---|
| 4,049,885 | 9/1977 | Mitoff . |
| 4,279,974 | 7/1981 | Nishio . |
| 4,424,262 | 1/1984 | vonAlpen et al. . |
| 4,529,676 | 7/1985 | Galloway et al. . |
| 4,546,055 | 10/1985 | Coetzer et al. . |
| 4,560,627 | 12/1985 | Bones et al. . |
| 4,592,969 | 6/1986 | Coetzer et al. . |
| 4,626,483 | 12/1986 | Bones et al. . |
| 4,722,875 | 2/1988 | Wright . |
| 4,772,449 | 9/1988 | Bones et al. . |
| 4,797,332 | 1/1989 | Barrow et al. . |
| 4,797,333 | 1/1989 | Coetzer et al. . |
| 4,975,344 | 12/1990 | Wedlake et al. . |

FOREIGN PATENT DOCUMENTS

| | | |
|---|---|---|
| 1274211 | 5/1972 | United Kingdom . |
| 1421702 | 1/1976 | United Kingdom . |
| 2193837 | 2/1988 | United Kingdom . |
| 2231567 | 11/1990 | United Kingdom . |
| 2240424A | 7/1991 | United Kingdom . |

OTHER PUBLICATIONS

"Fecralloy Steel As A Catalyst Support," Harwell Laboratory.

Primary Examiner—Anthony Skapars
Attorney, Agent, or Firm—Arnold, White & Durkee

[57] ABSTRACT

A laterally compressed envelope of solid electrolyte material is provided for use as an electrode holder in an electrochemical cell. It has two opposed major faces sealed together along at least part of the periphery of the envelope, each major face being provided by a sheet of said solid electrolyte material. Each sheet is provided on its inner surface with a plurality of ribs or corrugations extending alongside one another, each rib or corrugation of each said sheet crossing over a plurality of the ribs or corrugations of the other said sheet. The envelope has an internal volume, between the sheets, defined at least in part by grooves or valleys between the ribs or crests of the corrugations. Each part of said internal volume is in communication with each other part of said internal volume. The invention also provides a method of making the envelope, and an electrochemical cell in which the envelope forms an electrode holder.

12 Claims, 9 Drawing Sheets

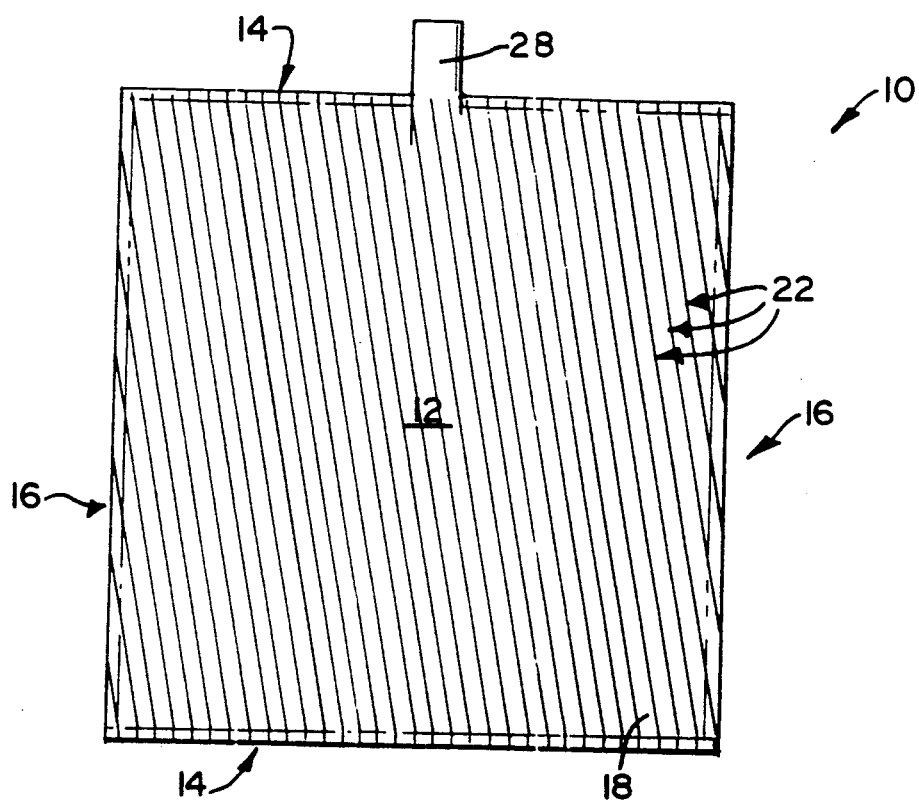
FIG 4
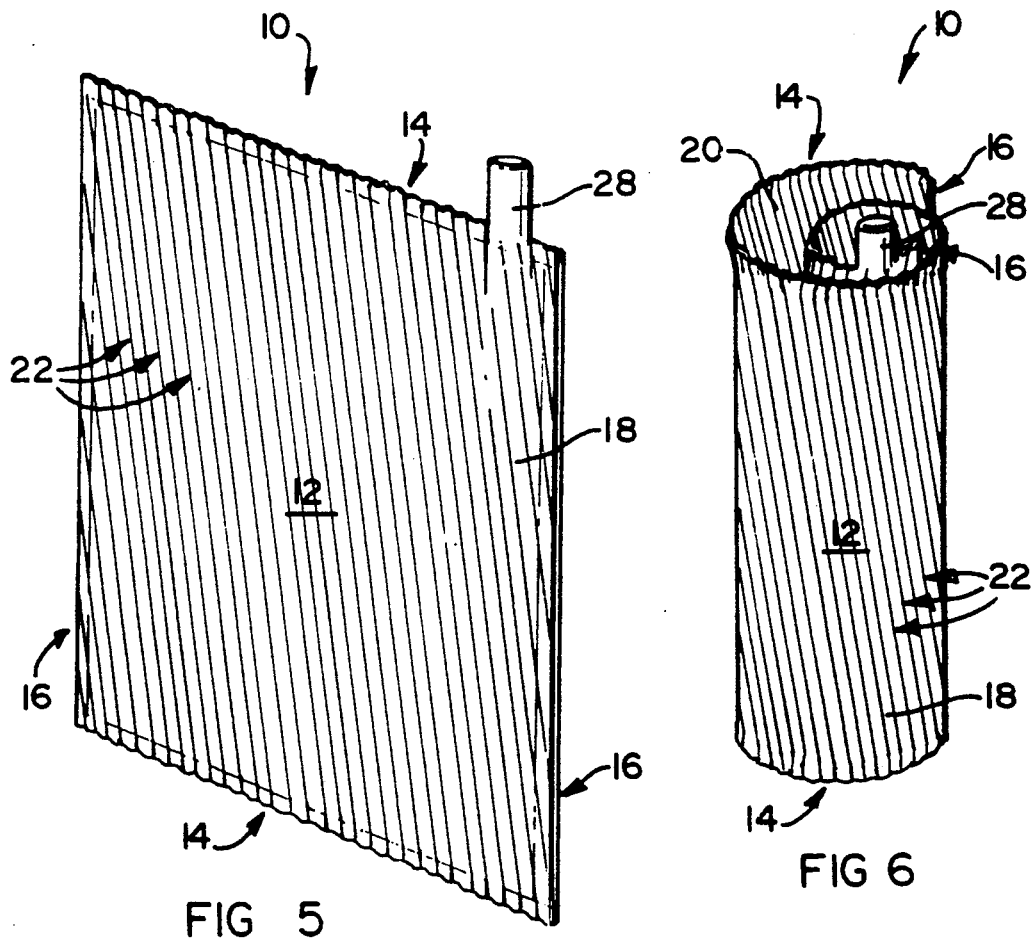
FIG 5
FIG 6

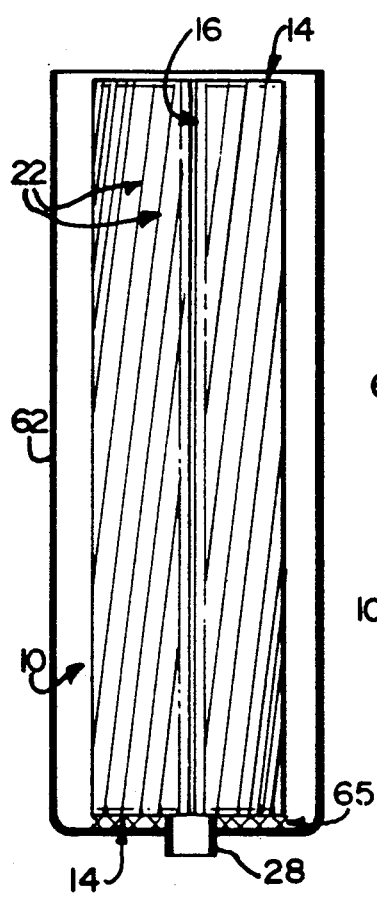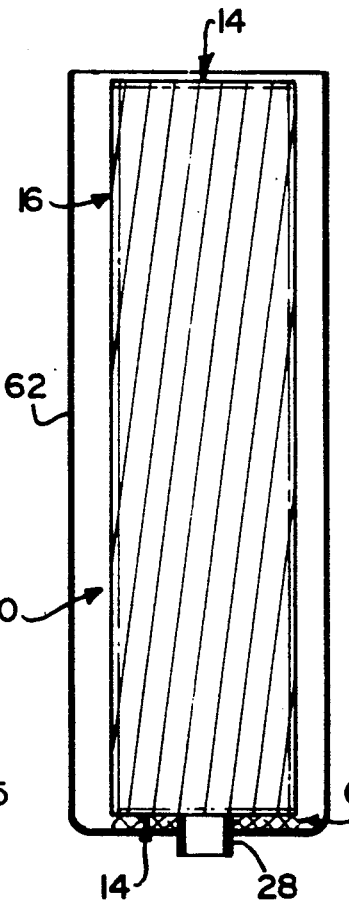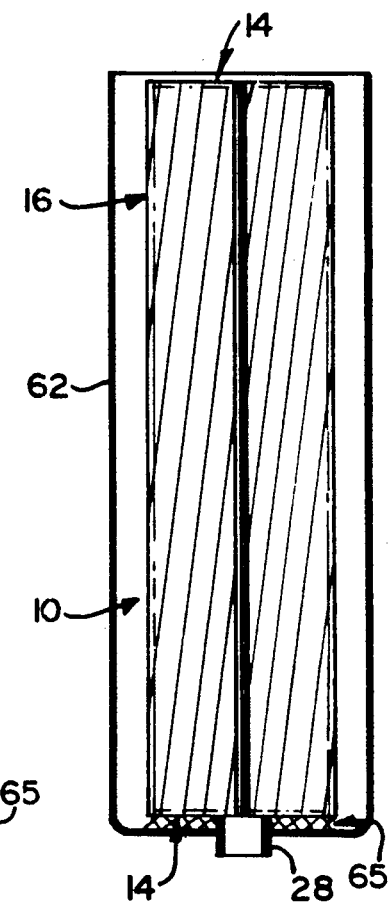
FIG 14    FIG 16    FIG 18
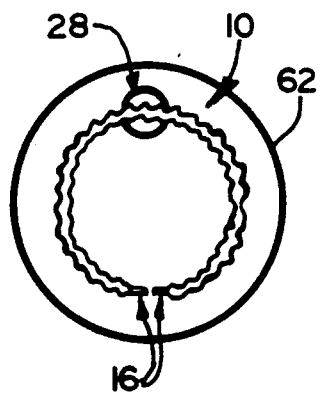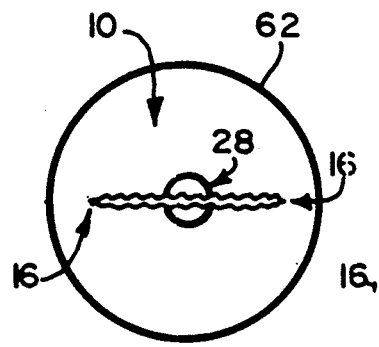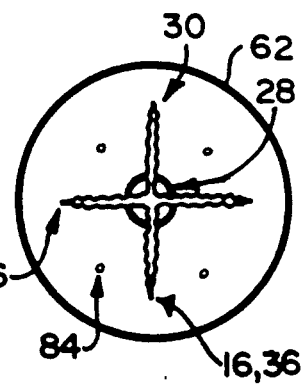
FIG 15    FIG 17    FIG 19

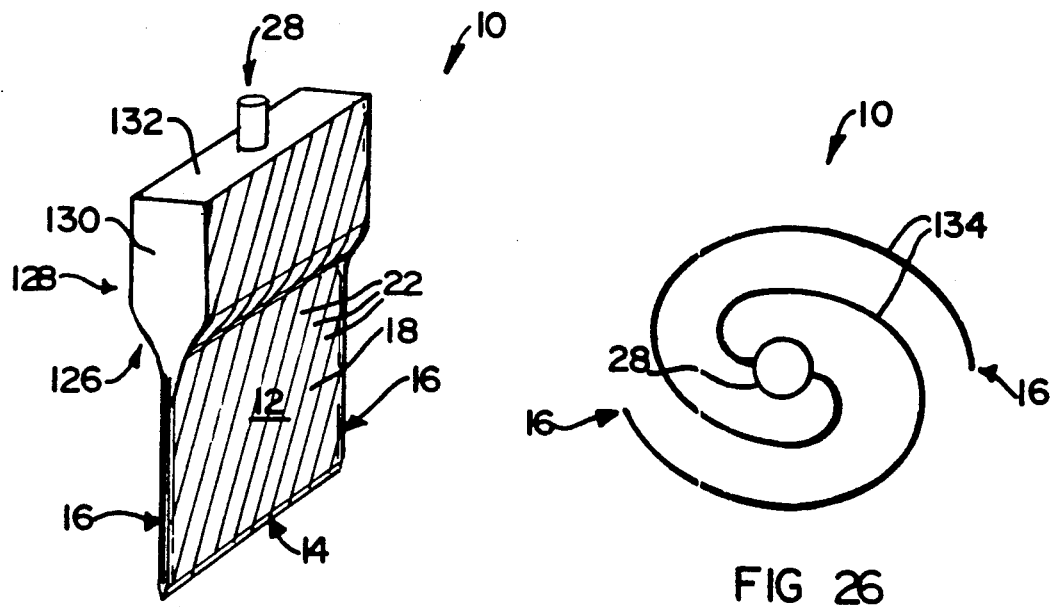
FIG 25
FIG 26
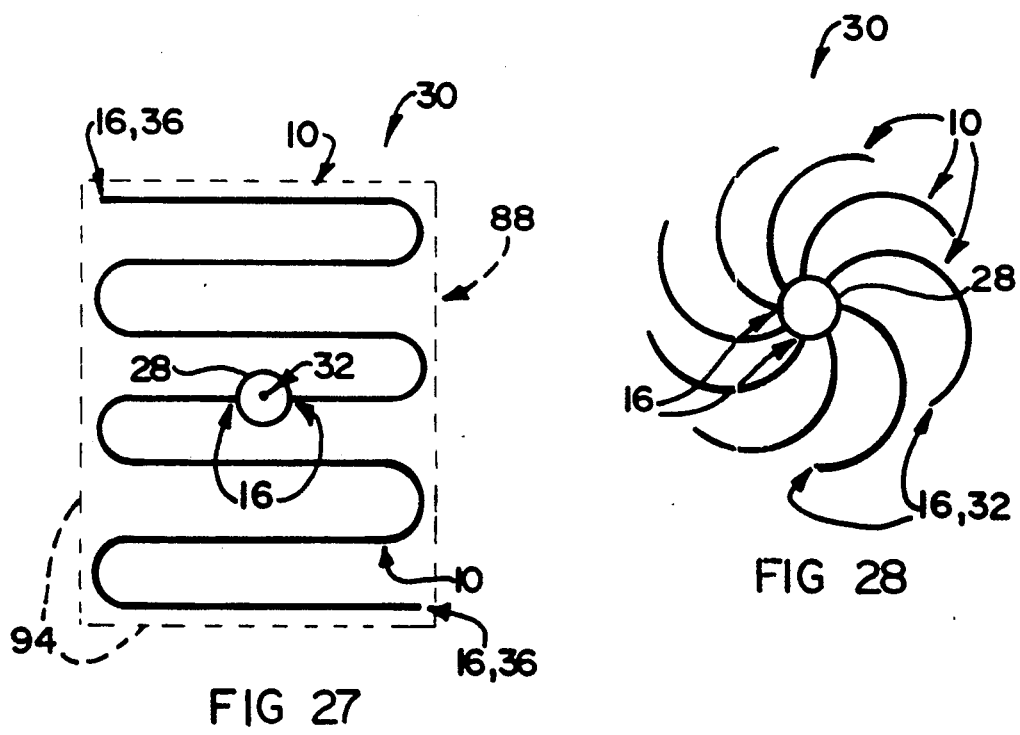
FIG 27
FIG 28

ELECTROCHEMICAL CELLS

This invention relates broadly to electrochemical cells. More particularly, the invention relates to a laterally compressed envelope of solid electrolyte material for use as an electrode holder in an electrochemical cell; to a method of making such envelope; and to an electrochemical cell having an electrode contained in such envelope.

According to one aspect of the invention there is provided a laterally compressed envelope of solid electrolyte material for use as an electrode holder in an electrochemical cell, the envelope having a pair of opposed major faces sealed together along at least part of the periphery of the envelope, each major face being provided by a sheet of said solid electrolyte material and each sheet being provided on its inner surface with a plurality of ribs or corrugations extending alongside one another, each rib or corrugation of each said sheet crossing over a plurality of the ribs or corrugations of the other said sheet, the envelope having an internal volume, between the sheets, defined at least in part by grooves or valleys between the ribs or crests of the corrugations, and each part of said internal volume being in communication with each other part of said internal volume.

In particular, the envelope may be suitable for use as an electrode holder in a high temperature rechargeable electrochemical power storage cell.

Typically the solid electrolyte material of the envelope and sheets will be of a ceramic material, although the possibility exists that they may be of, or at least comprise, ion-conducting glass or plastics material, and combinations of these materials may be used for the sheets. In practice, the solid electrolyte material will usually be a conductor of sodium ions, being e.g. of $\beta$-alumina, nasicon or preferably $\beta''$-alumina. Naturally, if it is required that the solid electrolyte be a conductor of ions other than those of sodium, other materials may be used, such as analogues of $\beta$- or $\beta''$-alumina, capable of conducting other metallic ions such as the ions of other alkali metals.

The ribs or corrugations of each sheet may be parallel to one another, the ribs or corrugations of each sheet extending at an angle to, i.e. non-parallel to, the ribs or corrugations of the other sheet and the sheets being in face-to-face abutment with each other so that the ribs or crests of the corrugations of each sheet, where they cross over the ribs or crests of the corrugations of the other sheet, are in contact with said ribs or crests of the corrugations of the other sheet at a plurality of positions, e.g. a multiplicity of positions, depending on the number of corrugations in the sheets.

In one construction of the sheets, each sheet may have a surface provided with said ribs or ridges with grooves therebetween, its other surface, which will form an outer surface of the envelope, being smooth and having no ribs or corrugations. Instead, however, each sheet as a whole is corrugated, e.g. sinusoidally corrugated in the fashion of corrugated iron, so that both surfaces of each sheet are corrugated.

Usually the ribs or corrugations of each of the sheets will be substantially identical in shape and size, and, when the corrugations are sinusoidal, the corrugations of each sheet may be arranged, at least at one or more edges of the sheets at the periphery of the envelope, to cross obliquely over the corrugations of the other sheet so that they are not normal thereto, e.g. so that there is an acute angle between the corrugations of the one sheet and the corrugations of the other sheet which is less than 45°, optionally less than 30°, the sheets being arranged so that, at said edge or edges, the corrugations of the one sheet are in phase with the corrugations of the other sheet and nest face-to-face therein, the sheets being sealed together where this nesting takes place and the corrugations of each sheet being inclined at an acute angle of at least 45° to said edge or edges.

In a particular embodiment of the envelope, each sheet as a whole may be corrugated so that both surfaces of each sheet are corrugated, the corrugations of each sheet being of the same shape and size and the corrugations of the sheets being arranged so that, at at least one edge of each sheet at the periphery of the envelope, the corrugations of each sheet cross over the corrugations of the other sheet at an acute angle of less than 45° and so that, at said edge, the corrugations of each sheet are in phase with the corrugations of the other sheet and nest face-to-face therein, the sheets being sealed to each other where this nesting takes place, and crossing said edge at an acute angle of at least 45°.

In certain cell constructions for which the envelope is intended, as described in more detail hereunder, the envelope may be in communication with a reservoir of molten active anode material, the envelope being intended to hold molten active anode material which acts as the anode of the cell. Thus, there may be an opening or inlet into the interior of the envelope from the exterior thereof, e.g. in the form of a tube or hole, to provide a feedthrough for electrode material, e.g. anode material, for connection to a reservoir of electrode material.

In one embodiment of the envelope it may be, as a whole, substantially flat and planar in shape, being e.g. square or rectangular in outline with straight ribs or corrugations, in which case, if it has a feedthrough for anode material, the feedthrough may be centrally positioned through one or both its major faces.

Instead, the envelope may form part of a composite electrode holder, two or more said envelopes being joined together with their interiors in communication. This communication may be provided by an elongated slot in a major face of each envelope or an elongated slot at the periphery of each envelope, e.g. at an edge thereof.

Thus, the envelope may be joined to at least one further envelope of the same size and shape to form a composite electrode holder, the interiors of the envelopes of the composite holder being in communication.

When the envelopes are of flat planar shape and form part of said composite holder, they may all be of substantially the same size and shape. In one example, two rectangular envelopes may be aligned face-to-face in register with each other and spaced from each other, each having a centrally positioned slot extending across a major face thereof and the envelopes being sealed to each other along the peripheries of the slots, which slots are in register with and opposed to each other. In one embodiment, the composite holder may thus comprise a plurality of said envelopes arranged face-to-face and in register, each adjacent pair of envelopes being in communication with each other via an elongated slot centrally positioned in respective major faces thereto, the envelopes of said pair being joined together along the periphery of said slot. This composite holder will have a neck where the peripheries of the slots are sealed to each other and, if the holder has a feedthrough for anode material, it may be provided at one end of this neck.

In another example, the composite holder may be more or less star-shaped in cross-section or end elevation, three or more rectangular envelopes of the same size and shape being aligned so that they radiate from a central axis, each having a slot along an edge thereof and their slots being located at or adjacent and parallel to said axis, the envelopes being sealed together at said edges at the peripheries of the slots, so that the slots all communicate with a central space surrounding said axis. In particular the composite holder may comprise at least three said envelopes which radiate in circumferentially spaced fashion, from a central axis, each envelope having a slot along the radially inner edge thereof, the envelopes being joined together at the peripheries of said slots so that they communicate via said slots with a central enclosed space along which said axis extends. In this case the holder may have an anode material feedthrough which enters an end of said central space.

The envelope may be curved about an axis; and said curve may be a spiral curve.

Accordingly in another embodiment of the envelope it may be, as a whole, of spirally or helically coiled shape, coiled around a central axis with its coils radially spaced from one another. The coiled envelope will typically have a shape which, if spread out and uncoiled into a flat and planar condition, is rectangular in outline. In this case the coiled envelope may be coiled about an axis extending parallel to two edges of its periphery, which edges are straight, the other two edges of the periphery being coiled. In this case, if the envelope has an anode material feedthrough, the feedthrough is preferably provided through one of the coiled edges of the envelope. Furthermore, the ribs or corrugations of each sheet are preferably arranged so that they are inclined at an acute angle to the coiled edges which is greater than 45°, and greater than the angle at which they are inclined relative to the straight edges, which angle will be less than 45°. Preferably these angles are respectively greater than 60° and less than 30°.

With regard to the directions of the ribs or corrugations of each sheet, it will be appreciated that the ribs or corrugations perform a reinforcing or strengthening function, with regard to bending or fracture of the envelope about an axis parallel to the sheets. Thus each sheet is most strengthened by its ribs or corrugations against bending or fracture about an axis parallel to the sheets and normal to the ribs or corrugations, but said ribs or corrugations provide little, if any, strengthening against bending or fracture about an axis parallel to the sheet and ribs or corrugations. As the ribs or corrugations of the one sheet are inclined relative to the ribs or corrugations of the other sheet, there is no axis about which the envelope can be bent or fractured which is parallel to the ribs or corrugations of both sheets. Thus, the ribs or corrugations of at least one of the sheets always provide at least some strengthening. This strengthening is at a minimum when the acute angle between the ribs or corrugations of the one sheet relative to those of the other sheet is very small, with regard to bending or fracture about an axis parallel to the sheets which is intersected by their ribs or corrugations at the same small acute angle, half the acute angle between the ribs or corrugations of the respective sheets. This aspect should be borne in mind when selecting the inclination between the ribs or corrugations of the one sheet and those of the other, so that the ribs or corrugations provide adequate strengthening in all directions against bending or fracture about various axes parallel to the sheets.

Instead of having a feedthrough for connection to a reservoir of electrode material, the envelope may have an expanded portion where the sheets are spaced apart from each other to provide a reservoir for electrode material in the envelope.

According to another aspect of the invention there is provided method of making a laterally compressed envelope of solid electrolyte material as claimed in claim 1, the method comprising the steps of:

formulating a mouldable mixture comprising the solid electrolyte material or a precursor thereof in a particulate form together with one or more binders which have both thermoplastic and setting properties;

forming the mixture into sheet material which is corrugated or has, on at least one side thereof, a ribbed surface;

forming the sheet material into a laterally compressed envelope having a pair of major faces formed from said sheet material, the inner opposed surfaces of the major faces being provided with said ribs or corrugations, each of the ribs or corrugations of the one sheet crossing over a plurality of the ribs or corrugations of the other sheet, and the major faces being sealed to each other along at least part of the periphery of the envelope; and treating the envelope to cure the setting binder or binders.

Still further according to the invention there is provided an electrochemical cell which comprises a cell housing defining an electrode compartment and, located within the electrode compartment, an electrode holder in the form of a laterally compressed envelope as described above, the interior of the holder forming another electrode compartment.

If the said electrolyte material or precursor thereof is capable of being sintered into an envelope which is a ceramic, the method may include the additional steps of:

heating the envelope to volatilize the binder or binders; and sintering the envelope after the binder or binders have been volatilized, to convert the envelope into a sintered ceramic artifact.

Suitable thermoplastic and thermosetting binders are known for the purpose of the present invention from British Patent 1 274 211, from which it emerges that, instead of employing separate binders respectively with thermoplastic and setting properties, a single binder may be used, provided that it displays both the required thermoplastic properties and the required setting properties.

Thus polyvinyl-butyral may be used, together with dibutyl phthalate as a plasticizer and methyl ethyl ketone as a solvent, as both the thermoplastic binder and the setting binder, the solvent and plasticizer facilitating blending into the solid electrolyte or precursor thereof in particulate form, to form a homogeneous mixture. Instead, a high energy mixer can be employed, such as a Banbury mixer, in which case the stabilizer and solvent can be dispensed with.

Forming the mixture into sheet material may also be described in British patent 1 274 211, e.g. by calendaring, rolling or by a doctor blade technique. The sheet material may also be densified as described in British patent 1 274 211, e.g. by roll compacting or pressing.

Forming the sheet material into the laterally compressed envelope will typically be by arranging two sheets of the material of the same size and shape (e.g. square) face-to-face in register with each other, and pinching their edges together with sufficient force plastically to deform them into each other, to form an integral join along said periphery between the sheets. The pinching may be with the sheets at an elevated temperature in the range of 50°–150° C., e.g. 60° C., at which temperature the binder exhibits a degree of thermoplastic softening. Instead, or in addition, particularly when the pinching takes place towards the lower end of said temperature range, the method may include applying said solvent to the edges, between them where they are pinched together, prior to the pinching, to permit the use of a reduced pinching force. Indeed, if desired, such solvent can be used with pinching to seal the edges together at room temperature.

Suitable methods for making the mixture, forming it into an envelope and heating and firing it are described in more detail in the Applicant's published British Patent Application 2231567A.

It is preferred to employ $\beta$-alumina or preferably $\beta''$-alumina in the mixture with one or more binders having thermoplastic and setting properties to form the sheet material for the envelope. However, instead and as indicated above, a precursor of $\beta$- or $\beta''$-alumina may be used, being a powder mixture comprising a suitable oxide or hydroxide of aluminium, together with soda and lithia or magnesia [or precursors thereof] in suitable proportions which mixture is known in the art to form $\beta$- or $\beta''$-alumina when sintered.

In accordance with a particular feature of the method, one or both surfaces of each sheet may be provided with a plurality of ribs or corrugations by rolling between appropriate rollers, at least one of which is correspondingly profiled to form the ribs or corrugations. Naturally, instead, the sheets can be moulded, cast etc to have the ribs or corrugations.

In a particular embodiment of the method, the sheets may be rolled to have sinusoidal corrugations and so that they are rectangular in shape, the corrugations being inclined at an acute angle of e.g. about 10° relative to two edges of each sheet and about 80° relative to the other two edges. The two sheets can be of a shape selected so that if they are arranged face-to-face in register with the corrugations of the one sheet inclined at an angle of about 20° relative to the corrugations of the other sheet, the ends of the corrugations of the respective sheets, where they intersect the edges of the sheets at 80°, are in register and in phase, so that they can nest, the corrugations of the one sheet nesting in those of the other sheet and vice versa. With the sheets in a plastic or thermoplastic state, the edges of the sheets where the corrugations are in phase and in register can be urged together, so that they converge together and nest face-to-face, the corrugations elsewhere, between said edges, crossing over once another with the crests of the corrugations of the one sheet optionally touching at least some of the crests of the corrugations of the other sheet.

The edges of the sheets can then be sealed together, e.g. by pinching as described above.

Naturally, particularly when the corrugations are small in amplitude, the two sheets can simply, while plastic, be sealed together by urging them together at the ends of the corrugations to form a flat join, without the necessity of matching the corrugations of the sheets to ensure said nesting.

The envelope may then be kept in a flat rectangular shape or, while plastic, may be coiled into a helix or spiral, the edges intersected by the corrugations at the smaller acute angle remaining straight and parallel to the axis of the helix or spiral, and the edges intersected by the corrugations at the larger acute angle being coiled. The helix or spiral may be circular in end elevation, or, if it is intended to be housed in a housing of square or rectangular cross-section, it may be coiled so that it and its coils are at least roughly square or rectangular in end elevation.

The envelope may be provided with an electrode feedthrough. This may be done by wrapping sheet material of the type used for the sheets of the holder around a former to form a tubular opening or neck, bonding one end of the neck to said outer sheets by suitable pressure at a temperature at which the binder is plastic, and removing the former to leave a feedthrough into the hollow interior of the envelope, e.g. at one end of the envelope at a central position, the remainder of the periphery of the holder being sealed as described above by pinching. Instead, the material of the sheets themselves may be shaped, e.g. by moulding or extruding, while in a plastic state, to form the neck. If desired, for use in an electrochemical cell, the neck or feedthrough may instead be made from a mixture in which the $\beta$-alumina of the outer sheets is replaced by $\alpha$-alumina of the same particle size. During sintering this will form an ionically and electronically insulating neck or feedthrough integrally bonded and sintered to the envelope. Instead a separately sintered $\alpha$-alumina or $\beta$-alumina neck may be glassed to an opening into the envelope.

Suitable corrugation sizes, for sheets of thickness 0.5–1.3 mm, have been found to be defined by an amplitude which is about 0.5–2 mm, the wavelength or pitch being of the same order of magnitude but somewhat larger, particularly when the envelope has a feedthrough for communicating with a reservoir of anode material. When no such reservoir is contemplated, a substantially larger amplitude may be employed, to provide the envelope with increased internal volume.

In this construction of the envelope, no spacers are required between the sheets to ensure that all the spaces therebetween are in communication with one another; and the corrugations provide enhanced mechanical strength. Having the corrugations of the one sheet cross over those of the other sheet at an angle of e.g. 10°–20° provides strengthening in all directions while it permits the envelope, when plastic, to be coiled relatively easily about an axis parallel to the edges of the sheets with which the corrugations make the smaller acute angles. The corrugations increase the surface area of the sheets relative to those of an envelope of the same size made of sheets having smooth surfaces. When coiled into a spiral, the envelope can be sintered while resting on a spirally coiled edge, facilitating volatilization of binder therefrom; and reliable communication between the various parts of its interior permits the inner surfaces of the sheets to be made from a starting mixture which produces a porous surface layer, after sintering, for wicking purposes, the remainder of each sheet being fully dense.

According to a yet further aspect of the present invention there is provided an electrochemical cell which comprises a cell housing defining an electrode compartment and, located within the electrode compartment, an electrode holder in the form of a laterally compressed envelope as described above, the interior of the holder forming another electrode compartment of the cell.

The cell will usually be a high temperature rechargeable electrochemical power storage cell.

One of said electrode compartments will be an anode compartment, the other being a cathode compartment. While it is in principle possible for the interior of the holder to be the cathode compartment, with the interior of the housing, outside the holder, being the anode compartment, it is expected that the interior of the holder or envelope will usually be an anode compartment.

While it is to be emphasized that the cell may be of the so-called sodium/sulphur type, having molten sodium as its active anode material and sulphur/sodium sulphide/sodium polysulphide as its active cathode material, it is expected that the cell will usually be of the type having an alkali metal such as sodium for its active anode material, its cathode comprising an electronically conductive, electrolyte-permeable porous matrix impregnated with an alkali metal aluminium halide electrolyte and having, in its charged state, an active cathode material in the form of a transition metal chloride selected from the group consisting of $FeCl_2$, $NiCl_2$, $CoCl_2$, $CrCl_2$, $MnCl_2$, $CuCl_2$ and mixtures thereof dispersed in the porous interior of the matrix.

Various such cells, their electrochemistry and methods of making them are described in U.S. Pat. Nos. 4,546,055, 4,529,676, 4,560,627, 4,592,969, 4,626,483, 4,722,875 and 4,772,449, 4,797,332, 4,797,333 and 4,975,334; in published British Patent Applications 2 193 837A and 2 231 567A. These prior art references also describe various aspects of separators of the type in question and molten alkali metal anodes suitable for use in such cells.

In particular the cathode matrix may be of the transition metal of the active cathode material, examples being porous iron, nickel, chromium, cobalt or manganese, and the active cathode substance in the charged state correspondingly being $FeCl_2$, $NiCl_2$, $CrCl_2$, $CoCl_2$ or $MnCl_2$ as the case may be. The alkali metal of the anode is preferably sodium, the separator being nasicon, beta-alumina, or, in particular, beta"-alumina.

As the liquid electrolyte, an electrolyte of the type $MAlHal_4$, in which M is an alkali metal and Hal is a halogen will usually be used, e.g. $NaAlCl_4$. In these electrolytes the molar proportion of Al ions should not exceed the molar proportion of alkali metal ions, i.e. the molar ratio of Al:M should not be greater than 1:1. This can be achieved by ensuring that the cathode compartment contains a proportion of solid alkali metal halide (MHal), e.g. NaCl, in contact with the liquid electrolyte during all states of charge of the cell.

With regard to electrolytes of the $MAlHal_4$ type, such as $NaAlCl_4$, in which the Al:M molar ratio is not more than 1:1, it is a particular advantage that, in addition to providing for substantial insolubility therein of active cathode substances such as $FeCl_2$, $NiCl_2$, $CrCl_2$, $CoCl_2$ or $MnCl_2$ when the Al:M ratio is 1:1, such electrolytes also exhibit their minimum vapour pressure (which is substantially less than that of sulphur/sodium sulphide/polysulphide) when said Al:M ratio is 1:1, at the cell operating temperatures typically encountered. This is important from a constructional and safety point of view as thin sheets of beta"-alumina can be brittle and prone to damage by high electrolyte vapour pressures, particularly during temperature excursions caused e.g. by cell malfunctions. Furthermore, such electrolytes exhibit relatively gentle freeze/thaw stresses on the separator plates; and a further feature of such electrolytes is that the alkali metal and electrolyte react, in the event of separator failure, to form solid reaction products at the temperatures in question, e.g. metallic Al and solid NaCl when Na reacts with $NaAlCl_4$ in which the Al:Na mole ratio is 1:1. All these features promote the employment of relatively thin electrode holder sheets with acceptable durability and resistance to failure, and acceptable safety, even in the event of failure.

Naturally, other suitable liquid electrolytes, e.g. other molten salt electrolytes may be employed, provided they contain cations of the alkali metal of the anode. Suitable electrolytes will usually contain halide anions such as chloride anions, being both chemically and electrochemically compatible with the separator and cathode and being incapable of poisoning the separator or of dissolving the active cathode substance, as such active cathode substances, when in solution in the electrolyte, are usually capable of poisoning the separator.

In the various patents and patent applications mentioned above, various options are described regarding the microstructure and electrochemical properties of the various features of the cells of the present invention. Thus U.S. Pat. No. 4,546,055 describes the basic cell electrochemistry from which the present invention is derived; U.S. Pat. No. 4,529,676 describes a method of making suitable cathodes for the cell of the present invention from a transition metal-containing matrix and the alkali metal halide discharge reaction product of the cathode, and it describes the possibility of using one or more intermediate refractory hard metal compounds of Fe, Ni, Co, Cr and Mn with at least one non-metal selected from the group comprising carbon, silicon, boron, nitrogen and phosphorous as the active cathode substance in its discharges state, the refractory hard metal compound being halogenated during charging by chlorination; U.S. Pat. No. 4,560,627 describes the use of $Co/CoCl_2$ or $Ni/NiCl_2$ as a cathode substance in parallel with a $Fe/Cl_2$ cathode to protect the $Fe/FeCl_2$ cathode from overcharging; U.S. Pat. No. 4,592,969 describes the use of fluoride anions as a dopant in an $NaAlCl_4$ electrolyte to resist progressive internal resistance rise of the cell with sustained cycling believed to arise from poisoning of a beta-alumina separator by $AlCl_3$ in the electrolyte; U.S. Pat. No. 4,626,483 describes the use of chalcogens such as S or Se as dopants in the liquid electrolyte and/or active cathode substance to resist progressive reduction in cathode capacity with sustained cycling, for $Ni/NiCl_2$ cathodes; U.S. Pat. No. 4,722,875 describes a method of making cathodes for cells according to the present invention from discharge reaction products of the cathode in particulate form with electrolyte; U.S. Pat. No. 4,772,449 describes a method of making a cathode suitable for the cells of the present invention by making a transition metal (Fe, Ni, Cr, Co or Mn) cathode matrix with sodium chloride dispersed therein by oxidizing the metal in particulate form followed by reduction thereof; U.S. Pat. No. 4,797,332 describes doping the surface exposed to the alkali metal of the anode of a ceramic solid electrolyte separator with a transition metal oxide to improve the wettability of the separator surface by molten anode alkali metal; U.S. Pat. No. 4,797,333 describes a method of making cathodes suitable for cells of the present invention by charging a cathode precursor comprising alkali metal aluminium halide molten salt electrolyte, alkali metal halide, aluminium and transition metal (Fe, Ni, Cr, Co or Mn); published British Patent Application 2 193 837A describes using magnesium dissolved in a sodium anode suitable for the cells of the present invention, when used with a beta-alumina separator, the magnesium acting as a getter for dissolved impurities in the sodium which can accumulate at the sodium/separator interface; U.S. Pat. No. 4,975,334 describes cells and batteries of the type in question having thin cathode structures; and published British Patent Application 2 231 567A describes methods of making cells of the type in question having thin cathode structures.

It will accordingly be appreciated that, as far as the microstructure and electrochemical properties of the various features [anodes, separators, cathodes, etc] of the cells of the present invention are concerned, and methods of making them, a large number of combinations and possibilities are available; as described, for example, in the abovementioned prior patents and patent applications; and combinations of these various options may be employed, where desirable and compatible.

In such cells in accordance with the present invention the envelope or holder may, if desired, contain substantially all the active anode material of the cell. Instead, the envelope or holder may be in communication with a reservoir, forming part of the cell, for active anode material Instead, the cell may have a tubular separator which divides the interior of the housing into an anode compartment and a cathode compartment, the anode compartment being outside the tubular separator, between the tubular separator and the housing, and the cathode compartment being in the interior of the tubular separator, the holder or envelope in turn forming a second anode compartment and being located in the interior of the tubular separator, in the cathode compartment and being optionally in communication with the anode compartment defined between the tubular separator and the housing.

In a particular embodiment, the holder may be helically or spirally coiled as described above, having a feedthrough for anode material through one of its coiled edges, a cylindrical anode material reservoir being sealed to the feedthrough and in communication, via the feedthrough, with the holder. In this case the reservoir and holder may be housed in a cylindrical housing, the reservoir being suspended from a top closure panel or lid for the housing, and the holder of envelope being suspended from the reservoir, below the reservoir, in the housing, the cathode being provided surrounding the holder in the housing and in the radial spaces between the coils of the holder.

In the embodiment, described above, in which there are two anode compartments, the tubular separator may be located concentrically in a cylindrical housing, the tube having a closed lower and en open upper end. In this case the holder may be suspended in the interior of the tube and may have a tubular anode material feedthrough which passes downwardly through an opening, to the periphery of which it is sealed, in the closed lower end of the separator and into the anode compartment located outside the tube. This holder may be a flat, rectangular holder, it may be a spirally coiled holder, or it may be a composite holder made from a plurality of envelopes as described above.

The invention will now be described, by way of example, with reference to the accompanying schematic drawings, in which:

FIG. 4 shows a view similar to FIG. 1 of another envelope in accordance with the invention for use as an electrode holder;

FIG. 5 shows a three dimensional view of a variation of the envelope of FIG. 4;

FIG. 6 shows a three dimensional view of another electrode holder in the form of a spirally coiled laterally compressed envelope in accordance with the invention;

FIG. 14 shows a sectional side elevation of part of a variation of the cell of FIG. 12;

FIG. 15 shows a sectional plan view of the cell part of FIG. 14, in the direction of line XV—XV in FIG. 14;

FIG. 16 shows a view similar to FIG. 14 of part of another variation of the cell of FIG. 12;

FIG. 17 shows a sectional plan view of the cell part of FIG. 16, in the direction of line XVII—XVII in FIG. 16;

FIG. 18 shows a view similar to FIG. 14 of the part of yet another variation of the cell of FIG. 12;

FIG. 19 shows a sectional plan view of the cell part of FIG. 18, in the direction of line XIX—XIX in FIG. 18;

FIG. 25 shows a three dimensional view of a further variation of the envelope of FIG. 1;

FIG. 26 shows a diagrammatic plan view of a yet further variation of the envelope of FIG. 1;

FIG. 27 shows a view similar to FIG. 26 of a variation of the holder of FIG. 7;

FIG. 28 shows a view similar to FIGS. 26 and 27 of a further variation of the holder of FIG. 7;

Figure 1:
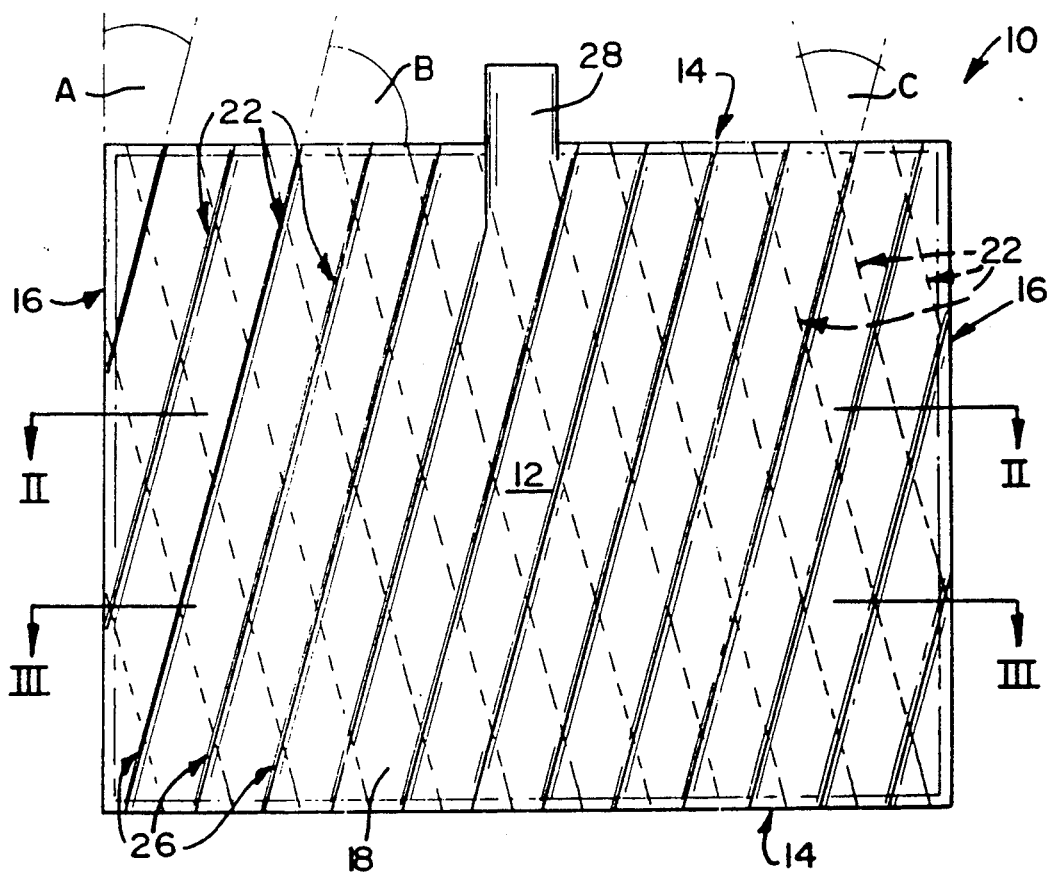
FIG. 1 shows a side elevation of an electrode holder in the form of a laterally compressed envelope in accordance with the present invention.

In the drawings, FIG. 1 shows a laterally compressed envelope generally designated 10 of $\beta''$-alumina for use as a liquid sodium anode holder in a high temperature rechargeable electrochemical power storage cell. The envelope 10 is flat and planar in shape having a rectangular outline, and has a pair of opposed major faces 12 sealed together along substantially the whole of the periphery of the envelope, provided by its end edges 14 and its side edges 16.

Figure 2:
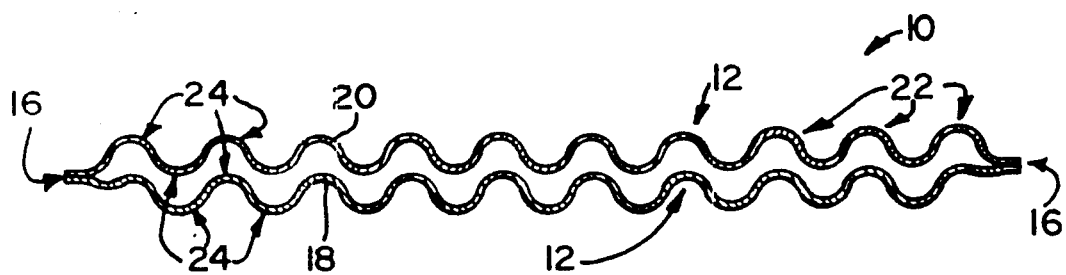
FIG. 2 shows a sectional end elevation in the direction of line II—II in FIG. 1, of the envelope of FIG. 1.
Figure 3:
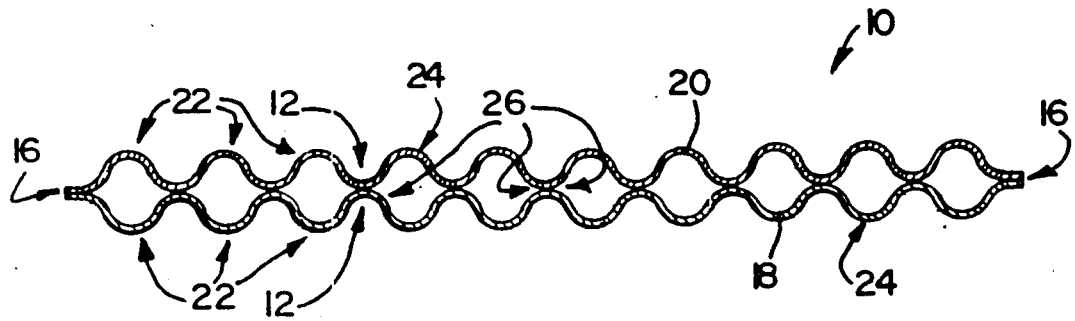
FIG. 3 shows a sectional end elevation in the direction of line III—III in FIG. 1, of the envelope of FIG. 1.

With reference also to FIGS. 2 and 3, in which the same reference numerals designate the same parts unless otherwise specified, it will be noted that the major faces 12 are provided by a pair of sheets 18, 20 of unitary sintered $\beta''$-alumina ceramic. Each sheet 18, 20, is corrugated by a plurality of substantially sinusoidal corrugations 22 having crests 24 and valleys between the crests. The corrugations 22 extend, on each of the sheets 18, 20 at an acute angle A of about 10° relative to the side edges 16, so that said corrugations 22 intersect the end edges 14 at an acute angle B of about 80°.

The sheets 18, 20 are thus arranged so that the corrugations 22 of the sheet 18 cross over the corrugations 22 of the sheet 20 at an angle C of 20°. In this regard, in FIG. 1, the sheet 20 is obscured by the sheet 18, and the corrugations 22 of the sheet 20 are shown in broken lines. The positions where the corrugations 22 of the sheet 18 cross over the corrugations of the sheet 20 are shown in FIG. 1 at 26.

The sheets 18, 20 are in abutment, face-to-face, so that they touch each other at at least a major proportion of the intersections 26, as shown in FIG. 3. In this regard it will be noted that the section of FIG. 3, at line III—III in FIG. 1, is taken through a row of intersections 26, whereas the section of FIG. 2, at line II—II in FIG. 1, is midway between two rows of intersections 26. Accordingly, in FIG. 3, the corrugations 22 of the sheets 18, 16, insofar they are visible in sectional end elevation, can be regarded as being 180° out of phase with one another, whereas in FIG. 2, the corrugations 22, similarly viewed, can be regarded as being in phase with one another, with the sheets 18, 20 spaced from each other. At positions intermediate the positions where the sections of FIGS. 2 and 3 are taken, the corrugations 22 of the one sheet will be partially out of phase with the corrugations of the other sheet, by an amount of between 0° and 180°.

It follows, importantly, that, although the sheets 18, 20 are in face-to-face abutment, the entire interior volume of the envelope 10 is, in all its parts, in communication with itself, as is best seen in FIG. 2, and no part of said interior volume is isolated from any other part thereof. The interior space of the envelope 10 is defined by the valleys between the corrugations 22 on the inner opposed surfaces of the sheet 18, 20.

At the end edges 14 of the envelope 10, the corrugations 22 of the two sheets 18, 20 are substantially in phase with each other, (similar to FIG. 2). Adjacent said end edges 14, the sheets 18, 20 converge towards each other in a longitudinally outward direction, so that, at and immediately adjacent said edges, the corrugations 22 of the sheet 18 nest snugly within the corrugations 22 of the sheet 20, in face-to-face abutment, where the sheets 18, 20 are sealed to each other. (This can be seen in FIG. 5). The sheets 18, 20 are substantially identical to each other, facilitating mass production thereof.

The envelope 10 has a feedthrough 28 in the form of a sintered ceramic hollow tube of $\beta$-alumina. The feedthrough 28 is provided at a central position in one of the end edges 14, between the sheets 18, 20, which are sintered sealingly thereto. The feedthrough 28 provides a means for feeding molten sodium anode material into the envelope 10, during loading of an electrochemical cell in which the envelope 10 forms a liquid sodium anode holder. The feedthrough 28 can also be employed as an inlet to the interior of the envelope 10, e.g. when the opposed inner faces of the sheets 18, 20 are to be treated for example by doping thereof with a transition metal oxide to improve the wettability thereof by sodium, as described in U.S. Pat. No. 4,797,332; and for charging a suitable getter such as magnesium into the interior of the envelope as described by U.S. Pat. No. 4,975,334.

The feedthrough is shown circular in cross-section. It should however be appreciated that it can be square or rectangular in cross-section, and can be elongated in cross-section, being e.g. in the form of a rectangular slot extending along said end edge 14. Naturally, in the other envelopes described hereunder, and in general, feedthroughs of square, rectangular and/or elongated cross-section can be used, when desired.

It is to be noted with reference to FIG. 1 that the amplitude and pitch of the corrugations is relatively large compared with the length of the end edges 14 and side edges 16. The envelope 10 of FIG. 1 is intended to hold, in its interior, all the liquid sodium anode material which it requires for use in an electrochemical cell, with the cell in its fully charged state. It is accordingly not intended for any connection via the feedthrough 28 (as described hereunder with reference to other embodiments of envelopes or holders in accordance with the invention) to a reservoir for liquid sodium anode material.

Turning to FIGS. 4 and 5, these show respectively a further envelope in accordance with the invention and a variation thereof, which are in many respects similar to the envelope 10 of FIGS. 1 to 3, so that, unless otherwise specified, the same reference numerals refer to the same parts.

The principal difference between the envelope 10 of FIG. 4 and that of FIGS. 1 to 3 is that the corrugations 22 are of a substantially smaller pitch and amplitude. Accordingly, the internal volume of the envelope of FIG. 4 is substantially smaller than that of the envelope of FIGS. 1 to 3. The envelope of FIG. 4 is intended for use in an electrochemical cell, in communication with an external reservoir (described in more detail hereunder) of liquid sodium anode material.

In FIG. 5, the only material difference, compared with FIG. 4, is that, whereas in FIG. 4, like FIGS. 1 to 3, the feedthrough 28 is centrally positioned on one of the end edges 14, in FIG. 5 the feedthrough 28 is adjacent one end of one of the end edges 14.

Turning to FIG. 6, once again, unless otherwise specified, the same reference numerals are used to describe the same parts as in FIGS. 1 to 5, unless otherwise specified. The essential difference between FIG. 6 and FIG. 5 is that, instead of being flat and planar and of rectangular outline as in FIG. 5, the envelope 10 of FIG. 6 is of spirally or helically wound shape, being coiled about a central axis parallel to its side edges 16, the coils of the envelope being radially spaced from one another.

To make the envelopes 10 of FIGS. 1 to 7, a mixture is made up of β"-alumina of about 10–50 μ particle size, binder, plasticizer and solvent. The binder, plasticizer and solvent will be of the type described in British Patent 1 274 211 and can be employed in the proportions set forth in the following table:

TABLE

| Constituent | Mass (g) |
| --- | --- |
| β-Alumina Powder | 80–120 |
| Binder | 14–18 |
| Plasticizer | 5–10 |
| Solvent | 0–5 |

When mixed together the constituents will form a semi-dry powder mixture. This is fed through a hot rolling machine having multiple rollers at 50°–150° C., depending on the composition employed, at which temperature the binder will plastic. The mixture will be rolled to form a flat sheet of thickness of about 0.5–1.5 mm, and having a density, after rolling of about 2.1–2.3 g/cm³. These sheets will then be rolled by a sinusoidally profiled roller, to make the corrugated sheet material for the sheets 18, 20, which can then be cut therefrom. The sheets will be cut so that they can be placed, in face-to-face abutment with each other, in the arrangement shown in FIGS. 1 to 5, with their side edges 16 in register and their end edges 14 in register, and in particular so that, at the end edges 14, the corrugations 22 of each of the sheets are in phase and in register with each other, so that they can nest face-to-face in each other in abutment.

The side edges 16 of the envelope can then be sealed at e.g. 50°–70° C. using a flat roller and hand pressure; the feedthrough 28 can be pinched and sealed at 50°–70° C. between the end edges of the sheets; and, while the sheets are plastic, their end edges and the adjacent material can be urged into face-to-face nesting abutment and sealed together by a pair of suitably sinusoidally profiled rollers.

A free-standing green envelope will be obtained which can then be heated and fired, e.g. according to the following regime: Ambient–450° C. at 10° C./hr 450° C.–1600° C. at 180° C./hr 1600° C.–1617° C. at 70° C./hr 1617° C.–hold for 15 minutes 1617° C.–1000° C. at 240° C./hr 1000° C.–ambient at 360° C./hr This firing regime results in a monolithic, unitary sintered β"-alumina envelope comprising about 98% by mass of β"-alumina having a density of 3.1–3.2 g/cm³, the envelope exhibiting a linear shrinkage of about 17–18% upon firing. The end edges and side edges of the sheets 18, 20 will be hermetically sealed to each other respectively to provide the edges 14, 16 of the envelope, and the end edges of the sheets 18, 20 at the end edge 14 of the envelope which receives the feedthrough 28, will be hermetically sealed to said feedthrough.

In the case of FIG. 5, the envelope will be spirally coiled, while it is in a plastic state, before firing. In this regard it is to be noted that the green envelope is preferably supported one of its end edges during firing, to permit reliable, even and complete volatilization of the binder, plasticizer and solvent during heating and before sintering takes place. This is facilitated in the case of FIG. 6, whose envelope can easily be supported on its coiled end edge 14 which does not have the feedthrough 28.

Figure 7:
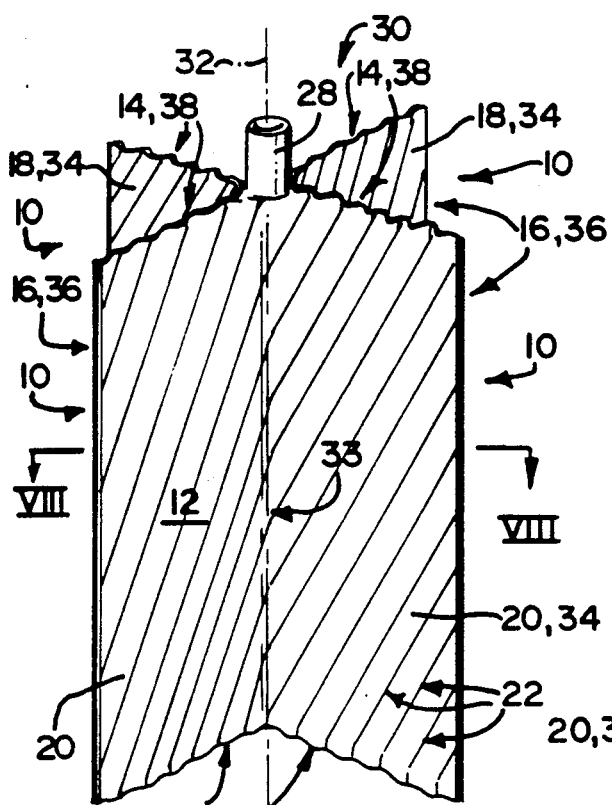
FIG. 7 shows a three dimensional view of a composite electrode holder in accordance with the invention.

Turning to FIG. 7, reference numeral 30 generally designates a composite electrode holder in accordance with the present invention. The holder 30 is cruciform in cross-section/end elevation, and can be regarded as four envelopes 10 of the general type shown in FIG. 4 joined together at one of the side edges 16 of each end thereof, so that they radiate from a central axis 32, being equally circumferentially spaced by an angle D of 90°. The sheets 18 and 20 of each envelope 10 are not sealed together at said inner side edges 16 so that each envelope 10 communicates via a slot between its sheets 18 and 20 at its inner side edge with a central space surrounding and coaxial with said axis 32.

The holder 30 can in principle be made by forming four envelopes 10 of the type shown in FIG. 4, but without separate feedthroughs 28 as shown in FIG. 4, and without sealing their sheets 18, 20 together at one of the side edges 16 of each thereof, to leave said slots. These envelopes can then be arranged in the cruciform arrangement shown in FIGS. 7 and 8, and the envelopes can be sealed at 33 to one another at their inner (slotted) side edges 16 at the peripheries of said slots to form the holder 30 in unitary and monolithic fashion. A single common feedthrough 28 can then be provided, as shown in FIG. 7, into one end of the central space surrounding the axis 32.

A preferred way of making the holder 30, however, is from four corrugated sheets of the type used for the sheets 18, 20 in FIG. 4. These corrugated sheets, while plastic, are each bent, about a central axis (at the position 33 in FIGS. 7 and 8) parallel to their side edges 16, through approximately 90°. They are then arranged together to form the structure shown in FIG. 7, the four sheets in question each being designated in FIG. 7 by reference numeral 34, their sides edges being located at 36. These side edges at 36 can then be sealed together in the same fashion as described above for the side edges 16 in FIGS. 1 and 4 and their end edges, as shown at 38 in FIG. 7, can be sealed together in the same fashion as described above for the end edges 14 in FIGS. 1 and 4.

The central space surrounding the axis 32 can then be closed off, at each end of the holder 30, by a plug or patch of β"-alumina sheeting of the same type as is used to make the corrugated sheets. At one end of this central space, the plug can be replaced by the common feedthrough 28, to which the periphery of said open end of the central space is sealed while the sheets are plastic, or a patch with an opening can be used, the periphery of the opening in the patch being sealed to the feedthrough 28.

The aforegoing manipulations will be carried out with the sheets in a plastic state, and after they have been sealed together in a plastic state, the holder can be sintered as described above.

Figure 8:
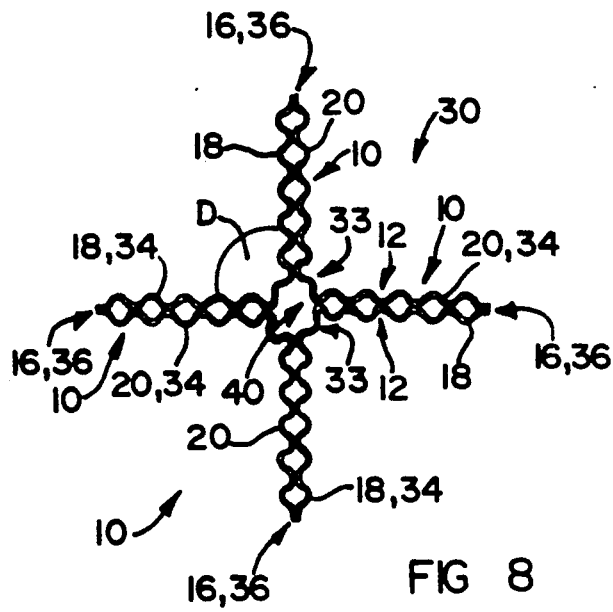
FIG. 8 shows a sectional end elevation, in the direction of line VIII—VIII in FIG. 7, of the holder of FIG. 7.

In FIG. 8 the same reference numerals are used as in FIG. 7, and the central space is shown at 40.

Figure 9:
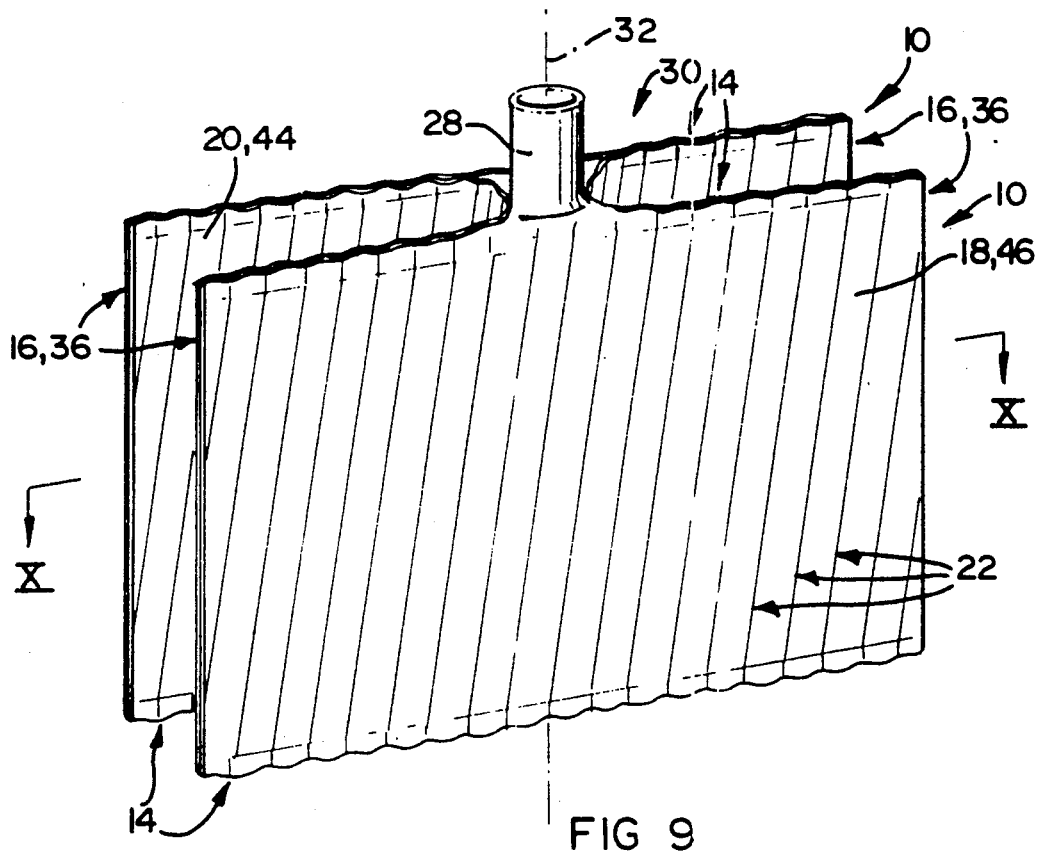
FIG. 9 shows a view similar to FIG. 7 of another composite electrode holder according to the invention.
Figure 10:
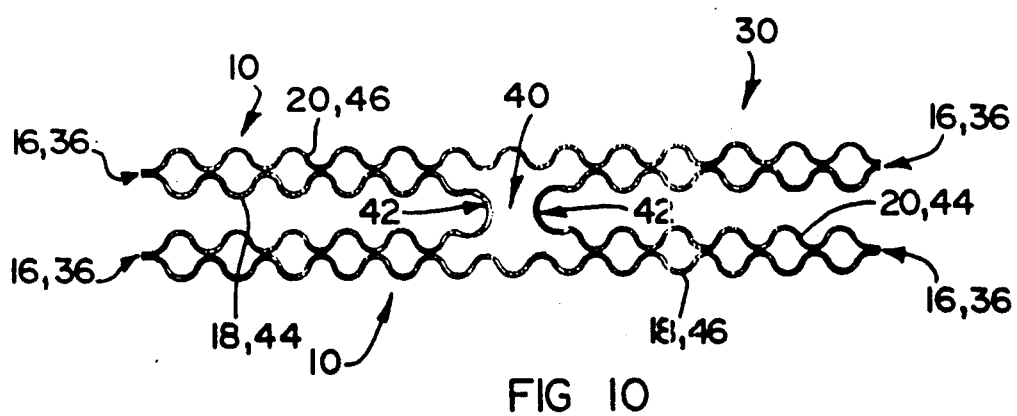
FIG. 10 shows a sectional end elevation of the holder of FIG. 9, in the direction of line IX—IX in FIG. 8.

In FIGS. 9 and 10, the same reference numerals are again used for the same parts as in FIGS. 7 and 8, unless otherwise specified. In the case of FIGS. 9 and 10, the holder is more or less I- or H-shaped in cross-section or end elevation. The holder 30 of FIGS. 9 and 10 can be regarded as being made of two envelopes 10 of the type shown in FIG. 4, each formed while plastic with a central slot extending between its end edges 14 and midway between and parallel to its side edges 16. The peripheries of these slots can be sealed together as at 42 in FIG. 10, to define the central space 40, one end of said central space again being closed off by a plug or patch, and the other end of said central space being closed off by the feedthrough 42, in similar fashion to that described for FIGS. 7 and 8.

In practice, however, it is expected that the holder 10 of FIGS. 9 and 10 will be made in a fashion broadly similar to that in which the holder 30 of FIGS. 7 and 8 is made, the major difference being that, instead of having all four sheets 34 bent through 90°, two of them are bent through 180°, and two of them are allowed to remain flat. In FIGS. 9 and 10 the sheets 34 bent through 180° are designated 44, and those which remain flat are designated 46.

The sheets 44 and 46 are arranged together as shown in FIG. 9 while they are plastic, their edges at 36 being sealed together and their end edges 14 being sealed together as described above for the envelopes 10 of FIGS. 1 and 4, with the necessary patches or plugs and feedthrough 38 being sealed in to position as described above for FIGS. 7 and 8, prior to sintering.

Figure 11:
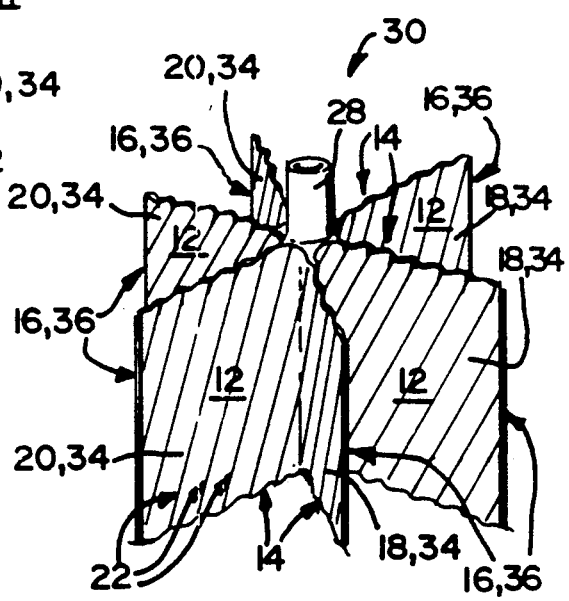
FIG. 11 shows a view similar to view similar to FIG. 7 of another composite electrode holder according to the invention.

Turning to FIG. 11, a similar construction to that shown in FIGS. 7 and 8 is again shown, and again, unless otherwise specified, the same reference numerals refer to the same parts. The essential difference between the holder 30 of FIG. 11 and that of FIGS. 7 and 8 is that it employs six sheets 34. The sheets 34, instead of being bent through about 90°, are bent through about 60°, so that they can be arranged together as shown to provide a star-shaped holder in cross-section or end elevation, with six equally radially spaced limbs or points spaced apart by 60°.

Figure 12:
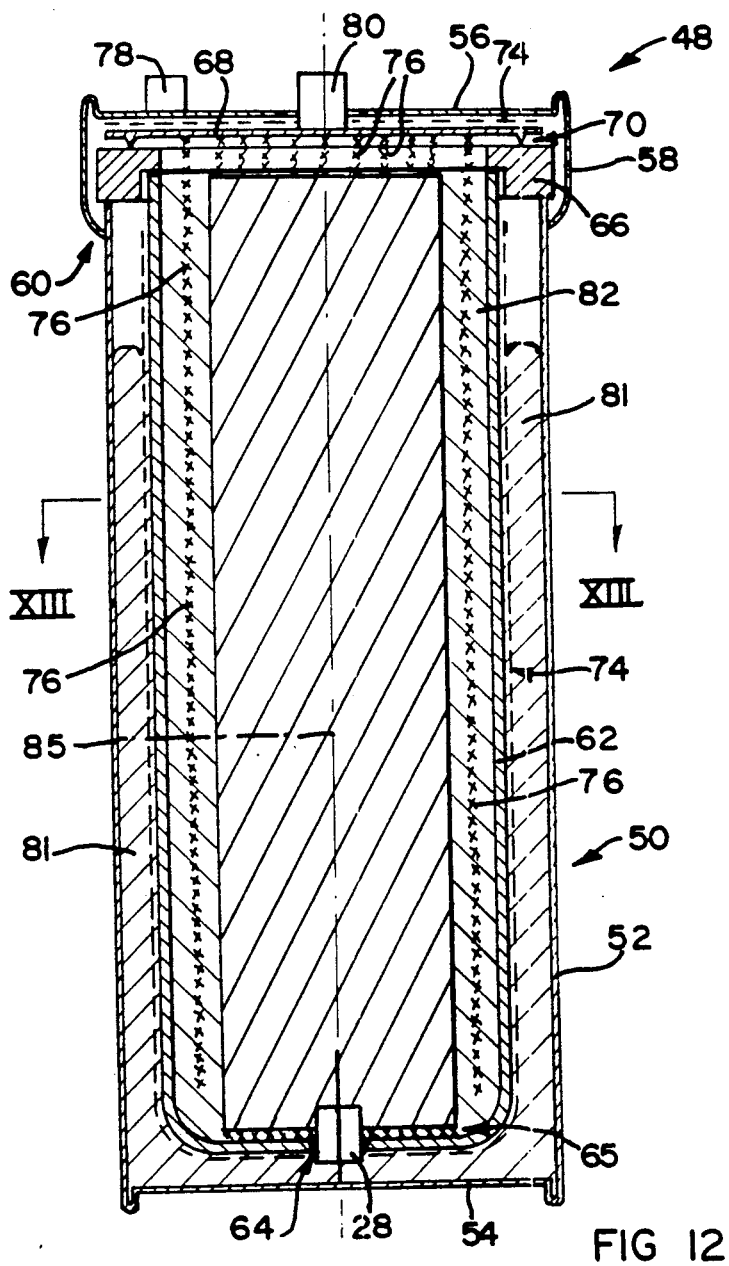
FIG. 12 shows a sectional side elevation of an electrochemical cell in accordance with the invention.
Figure 13:
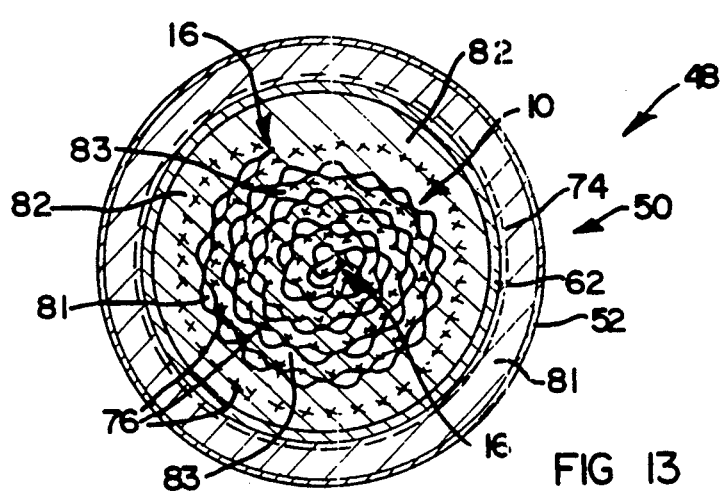
FIG. 13 shows a sectional plan view, in the direction of line XIII—XIII in FIG. 12, of the cell of FIG. 12.

Turning to FIGS. 12 and 13, an electrochemical cell in accordance with the present invention is generally designated 48. The cell 48 is shown having a cylindrical housing, e.g. of steel, designated 50 and having a cylindrical side wall 52, a circular floor 54 welded to the side wall 52 and a circular cap or closure disc 56 welded to a skirt 58 whose lower periphery is in turn welded at 60 to the side wall 52 at a position adjacent the top of the side wall 52.

A tubular $\beta''$-alumina separator 62 is provided concentrically in the housing 50, the separator tube 62 having a closed lower end and an open upper end. The lower end of the separator tube has a central circular opening at 64. The upper open end of the separator tube 62 is hermetically glass welded to a α-alumina insulating ring 66.

A disc-shaped metal seal 68 closes off the upper end of the tube 62, being provided on the lower face thereof with a circular sealing edge 70 which seals against the upper surface of the ring 66. The seal 68 is held in sealing engagement with the ring 66 via the sealing edge 70 by an insulating disc 74 which separates said seal 68 from the closure disc 56, suitable force being exerted on the seal 68 via the insulating disc 72 by means of the closure disc 56, the housing being welded together in a fashion to provide such force.

In the interior of the separator tube 62 is located an electrode holder 10 of the type shown in FIG. 6, but made of a flat holder of the type shown in FIG. 5, coiled so that feedthrough 28 is in a more or less central position.

In the cell 48 the feedthrough 28 is arranged so that it projects downwardly through the central opening 64 in the closed lower end of the separator tube 62. The spirally coiled lower end edge 14 of said envelope 10 is glass welded at 65 to the inner surface of the lower closed end of the tube 62, and the outer periphery of the feedthrough 28 is sealingly welded into the periphery of the opening 64. This can be achieved by locating the envelope 10 in the separator tube 62 with glass frit in the bottom of the tube 62 and heating the tube to melt the glass, the amount of frit and heating being selected so as to seal the feedthrough 28 in position and weld the envelope 10 at 65 to the tube 62.

The cell 48 is shown with a woven sock 74 of steel mesh wicking material enclosing and in abutment with the outer surface of the separator tube 62 and a spirally wound woven sheet 76 of steel mesh current collecting material wound helically and coaxially with the coils of the envelope 10, the woven steel current collecting sheet 76 being located around the curved periphery of the envelope 10, and coiled into the radial spaces between the coils of the envelope 10. The woven current collecting sheet 76 extends vertically over the full height of the envelope 10, and has its upper edge fast with the seal 68, which is similarly of steel.

The cell is provided with an anode terminal 78 fast with the disc 56 and a cathode terminal 80 fast with the seal 68 and projecting upwardly from the seal 68 through a central opening 64 in the disc 56, the terminal 80 being electrically insulated from the disc 56.

The annular space between the tube 62 and the housing 50 is shown containing molten sodium anode material 81, and the interior of the envelope 10 likewise contains molten sodium anode material 81, said interior of the envelope 10 being in communication with the annular space between the tube 62 and housing 50 via the feedthrough 28. Inert gas under pressure is provided in an upper portion of the annular space between the tube 62 and housing 50, to ensure that the interior of the envelope 10 remains filled with molten sodium anode material at all times.

The space 82 between the tube 62 and envelope 10, and the radial spaces 83 between the coils of the envelope 10, are filled with cathode material. This cathode material comprises an electronically conductive, electrolyte permeable porous matrix of e.g. Fe or Ni, saturated with molten $NaAlCl_4$ liquid electrolyte. The porous spaces in the interior of the matrix have finely divided $FeCl_2$ or $NiCl_2$, as the case may be, dispersed therein, together with finely divided NaCl so that in the fully charged state of the cell the molar proportion of $AlCl_3$ in the electrolyte is never greater than the molar proportion of NaCl therein.

U.S. Pat. Nos. 4,722,875 and 4,797,333, mentioned above, teach that cathodes of this type can be made by initially charging a powder mixture into said spaces between the envelope 10 and tube 62, in the radial spaces between the coils of the envelope 10, followed by charging of the cell. In this case the interior of the envelope 10 and the annular space between the tube 62 and housing 50 can be evacuated prior to the initial charge cycle, in which case inert gas under pressure can be dispensed with but the interior of the envelope 10 should instead be provided with an aluminium wire current collector extending over its full depth, as shown schematically by a chain-dotted line at 85.

FIGS. 14 and 15 show a variation of part of the construction of the cell of FIGS. 12 and 13. The same reference numerals are used for the same parts in FIGS. 14 and 15 as are used in FIGS. 12 and 13, the tube 62 and envelope 10 being shown. The major difference between the construction of FIGS. 14 and 15 compared with that of FIGS. 12 and 13 is that the envelope 10 is, prior to sintering thereof, bent about an axis parallel to its side edges 16 into a cylindrical shape of circular cross-section, as opposed to a spiral shape, the side edges of the envelope 10 being shown at 16 and the feedthrough 28 being centrally positioned through one of the end edges 14 of the envelope 10.

In the case of FIGS. 14 and 15 the cathodes will be provided with appropriate current collecting sheets similar to that shown at 76 in FIGS. 12 and 13 but not shown in FIGS. 14 and 15, located both inside the hollow interior of the cylinder provided by the envelope 10, and in the annular space between the envelope 10 and tube 62.

In the case of FIGS. 16 and 17, which show a further variation of the construction shown in FIGS. 14 and 15, an elongated rectangular envelope 10 is shown with its feedthrough 28 centrally positioned through one of its end edges 14, and accordingly passing centrally through the closed lower end of the tube 62. In FIGS. 16 and 17 the cathode and current collecting sheet (see 76 in FIGS. 12 and 13) will merely be on opposite sides of, and face-to-face with, the envelope 10.

The construction shown in FIGS. 18 and 19 is again essentially similar to that shown in FIGS. 14 to 17, unless otherwise specified. In the case of FIGS. 18 and 19 a composite holder 30 of the type shown in FIGS. 7 and 8 is located in the tube 62, the cathode being located in the four segmented zones defined between the radiating points at 36 of the envelope 30; and the cathode current collector, instead of being a sheet, is in the form of four metal strips 84 extending the length of the holder 30 and being connected to the seal (see 68 in FIG. 12).

Figure 20:
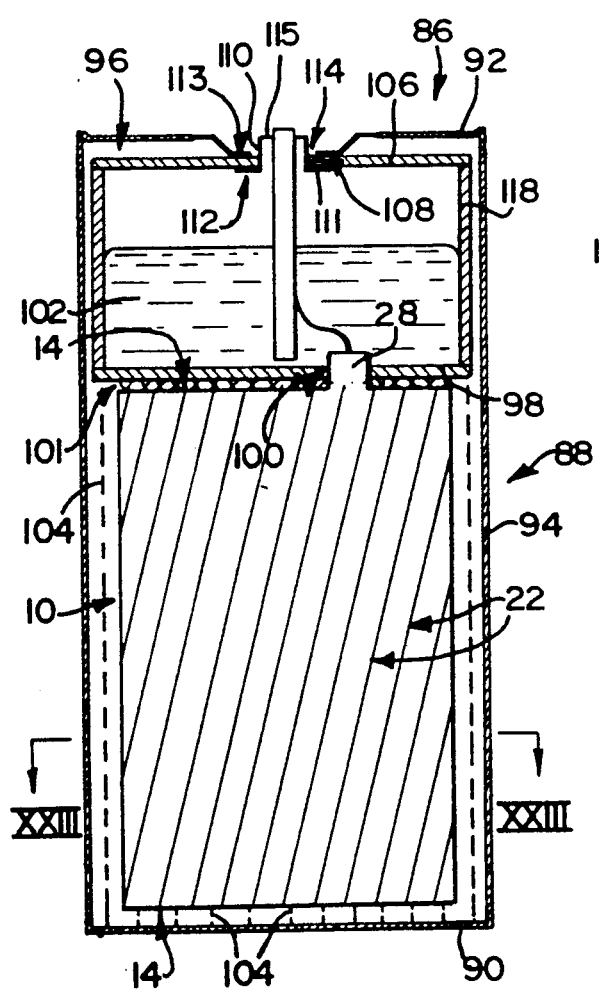
FIG. 20 shows a view similar to FIG. 12 of another electrochemical cell in accordance with the invention.

Turning now to FIG. 20, a further electrochemical cell in accordance with the invention is generally designated 86. This cell has a housing 88 with a floor 90 and a closure disc or lid 92, the lid 92 and floor 90 being welded to opposite ends of a circular cylindrical side wall 94 of the housing 88.

A squat cylindrical α-alumina reservoir 96 is located in the upper portion of the housing 88, and has a lower circular floor 98 provided with an opening 100. A coiled envelope 10 of the type shown in FIG. 12 is provided in the lower portion of the interior of the housing 88, below the reservoir 96, the feedthrough 28 of the envelope 10 being at what in FIG. 20 is the upper end edge 14 of the envelope 10, and projecting into the interior of the reservoir 96. Said feedthrough 28 is sealed by glass hermetically into the opening 100, and said upper sealed edge 14 is welded by glass at 101 to the lower surface of the floor 98, so that the envelope 10 is suspended from the reservoir 96. The reservoir 96 is shown partially filled with liquid sodium anode material 102. Current collecting sheet material 104 surrounding and spirally intercoiled with the coils of the envelope 10 in a fashion similar to that described above with reference to the current collecting sheets 76 of FIG. 12, is provided. This is embedded in a cathode which fills the annular space between the envelope 10 and housing 88 and occupies the radial spaces between the coils of the envelope 10, again in a fashion similar to that described above for the cell of FIG. 12. The lower coiled edge of the sheet 104 is in electrical contact with the floor 90 of the housing 88.

The reservoir 96 has a circular roof 106 having a central opening 108. A steel spigot 110 provides a neck into the opening 108 of the reservoir 96, having a radially outwardly projecting circumferential flange 111 at its lower end, which is thermocompression bonded at 113 to the inner or lower surface of the roof 106. The lid 92 of the housing 88 has a central opening 114 through which the spigot 110 projects upwardly, the periphery of said opening 114 in turn being thermocompression bonded at 113 to the outer or upper surface of the roof 106 of the reservoir 96. A radial space is left between the periphery of said opening 114 and the spigot 110, so that they are electrically insulated from each other. The spigot 110 has its outer end closed by a metal closure 115. A steel post current collector 116 (which provides the anode terminal of the cell, the housing 88 providing the cathode terminal) projects downwardly through this closure panel into the sodium 102. The interior of the envelope 10 is filled with sodium and communicates via feedthrough 28 with the sodium 102 in the reservoir 96. A current collecting wire 117 extends from the post 116 via the feedthrough 28 to a position adjacent the lower end edge 114, in the interior of the envelope 10.

With regard to the reservoir 96, it has a circular cylindrical side wall 118, and this side wall, and optionally the floor 98, may be of β''-alumina instead of α-alumina. It will be noted from FIG. 21 that a central portion 119 of the lid 92 is thermocompression bonded at 113 to the roof 106, its periphery being welded to the remainder of the lid 92.

Figure 21:
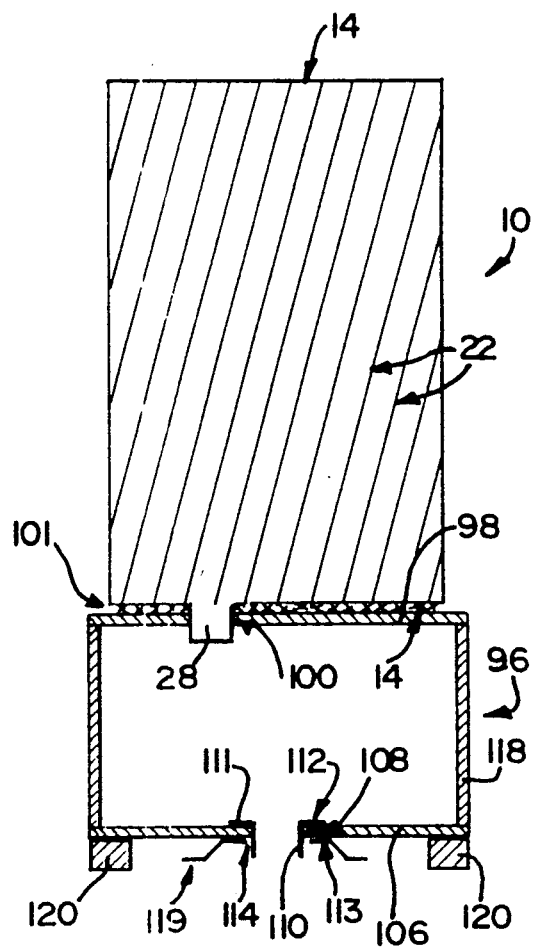
FIG. 21 shows a part sectional side elevation of a portion of the cell of FIG. 20, during manufacture thereof.

In FIG. 21, the envelope 10 and reservoir 96 are shown during connection thereof to each other, in an inverted condition with respect to the arrangement shown in FIG. 20. To join them together glass frit is provided at 101 on what in FIG. 21 is the upper or outer surface of the floor 98, and around the periphery of the opening 100. The reservoir is supported on supports 120, e.g. of α-alumina, and is heated to a temperature at which the glass frit melts to provide the glass seal between the feedthrough 28 and periphery of the opening 100 in the floor 98, and the glass weld at 101 whereby the coiled end edge 14 of the envelope 10 which abuts said floor 98 is welded to said floor.

Figure 22:
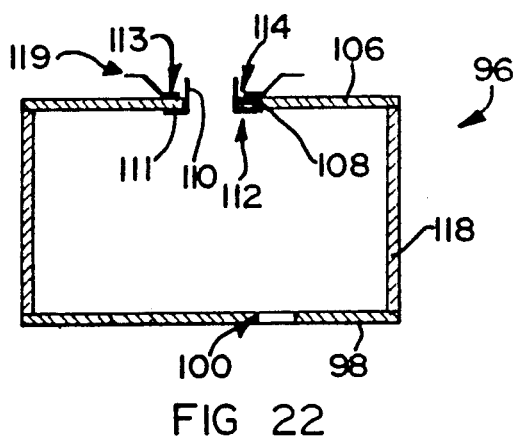
FIG. 22 shows a sectional side elevation of a reservoir for electrode material, forming part of the cell of FIG. 20.

FIG. 22 shows the reservoir 96 by itself, and the same reference numerals refer to the same parts in FIG. 22 as in FIGS. 20 and 21.

Figure 23:
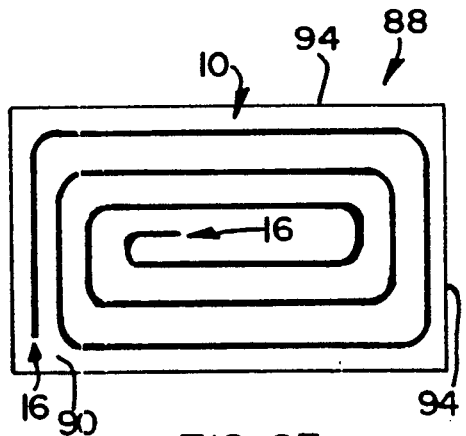
FIG. 23 shows a diagrammatic sectional plan view of yet another electrochemical cell in accordance with the invention.

Turning to FIG. 23, a diagrammatic sectional plan view is shown of a cell similar to that shown in FIGS. 20 to 22, the section being taken in a position equivalent to that shown at XXIII—XXIII in FIG. 20. The same reference numerals are used as in FIGS. 21 to 22, and it will be appreciated that the essential difference between the cell of FIG. 23 and the cell of FIGS. 20 to 22 is that, instead of a housing 88 having a circular cylindrical side wall 94, the side wall 94 in FIG. 23 is elongate rectangular in cross-section, as are the floor 90 and lid (not shown). The envelope 10 is accordingly coiled into a spiral which is broadly elongate rectangular in profile in cross-section or end elevation/plan view.

Figure 24:
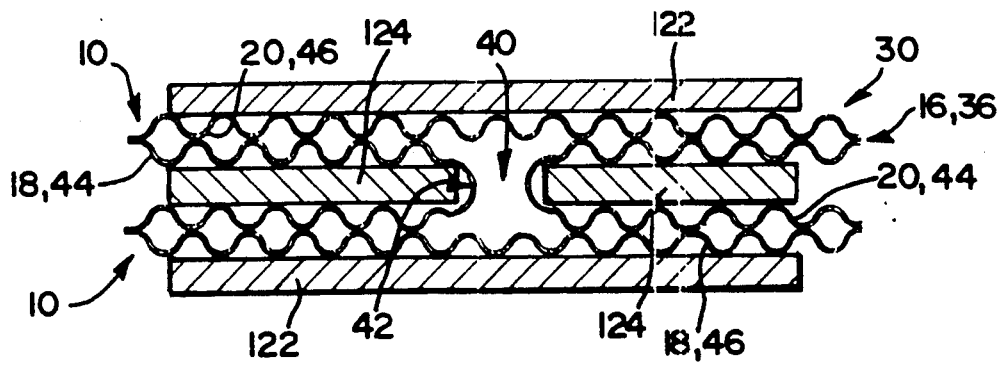
FIG. 24 shows a sectional end elevation, corresponding to FIG. 10, of part of yet another variation of the cell of FIG. 12, employing the composite electrode holder of FIGS. 9 and 10.

Turning to FIG. 24, an arrangement is shown of the composite anode holder 30 of FIGS. 9 and 10, with cathode material. The same reference numerals are used to designate parts of the holder 30 as are used in FIGS. 9 and 10. The cathode material is shown in the form of four rectangular plates, namely two large outer plates 122 closely spaced from and opposed to the outer faces of the envelope 10, and two smaller plates 124 located respectively in the spaces between the envelopes 10, on opposite sides of the central space or neck 40 of the holder 30.

Turning to FIG. 25, reference numeral 10 again indicates an envelope according to the invention. The lower portion of the envelope 10 shown in FIG. 25 is similar to that of the envelope 10 of FIGS. 1–3, and unless otherwise specified, the same reference numerals refer to the same parts. In the upper region of the envelope the sheets 18, 20 (see FIG. 2) diverge from each other at 126 to provide the envelope 10 with an expanded upper portion 128 where said sheets 18 are spaced parallel from each other to provide a reservoir for liquid sodium anode material. The sides of this reservoir 128 are closed off by respective panels 130 of β-alumina which may be integrally sintered therewith or glass welded to the sheets 18, 20; and the upper end of the reservoir 148 is closed off by a β"-alumina panel 132, similarly connected to the sheets 18, 20 and to the panels 130. The panel 132 is provided with a feedthrough 28 of the type described above.

In FIG. 26, the envelope is again designated 10 and the same reference numerals are used as in FIGS. 1–3, unless otherwise specified. In FIG. 26, the envelope 10 is shown having two portions 134 on opposite sides of the feedthrough 28, each portion 134 spiralling helically inwardly from its side edge 16 towards the centre, where the feedthrough 28 is located.

In FIGS. 27 and 28 the same reference numerals are used as in FIG. 7, unless otherwise specified. In FIG. 27 there are two envelopes 10, each joined at a side edge 16 thereof to radiate diametrically outwardly from the central axis 32 (see also FIG. 7). These envelopes are folded as shown about axes parallel to the axis 32 so that the holder 30 occupies a space which in plan view has an elongate rectangular outline, suitable to be received in a housing 88 with walls 94 (shown in broken lines) similar to the housing 88 shown in FIG. 23, which is elongate rectangular in sectional plan view. In FIG. 28 there are eight envelopes 10 radiating in equally circumferentially spaced fashion from the central axis 32 (see also FIG. 7). The envelopes 10 in turn spiral helically inwardly from their side edges 16, 36 in a fashion similar to the portions 134 of FIG. 26. This holder 30 is suitable for location in a housing (see 88 in FIG. 27), but of circular cross-section.

Figure 29:
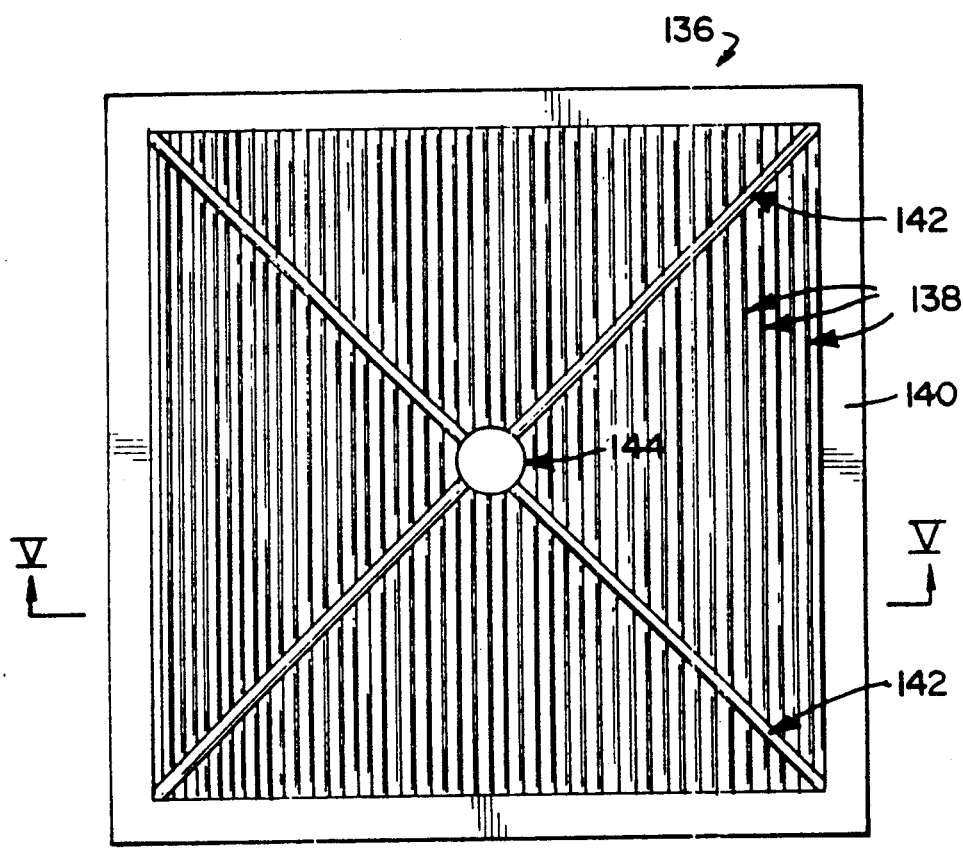
FIG. 29 shows a face-on view of the interior surface of a sheet of mouldable mixture for making an envelope according to the invention.
Figure 30:
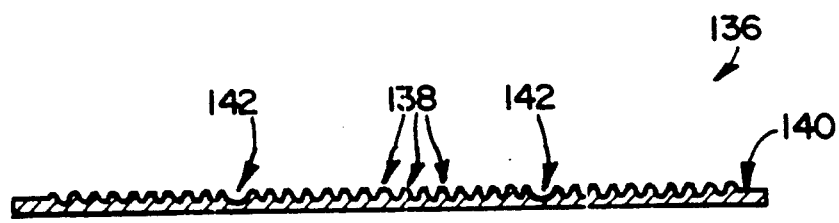
FIG. 30 shows a section in the direction of line XXX—XXX in FIG. 29.

Turning to FIGS. 29 and 30, a sheet 136 for making up an envelope according to the invention is shown respectively face-on to its inner surface and in sectional side elevation, in a mouldable plastic state, before formation of said envelope. The sheet 136 is made typically of powdered β"alumina mixed together with a polyvinyl-butyral thermoplastic/thermosetting binder, together with dibutyl phthalate plasticizer and methyl ethyl ketone solvent to provide a mouldable mixture. This mixture is rolled into a square flat sheet, between a flat roller and a corrugated roller, to provide one side of the sheet 136 with ribs or corrugations 138. The sheet is then pressed to provide it with an uncorrugated flat periphery 140 and a pair of channels 142 extending along its diagonals, each extending from the periphery 140 at one a corner of the sheet, to the opposite corner. A central opening 144 is punched in the sheet. The arrangement is such that each of the grooves or valleys defined by the corrugations 138 intersects at least one of the channels 142, except at the centre of the sheet 136, where said channels 142 are interrupted by the opening 144, and where the grooves or valleys, instead, intersect said opening 144.

To make this envelope a pair of the sheets 136 are placed face-to-face, with their corrugated faces abutting, but with the corrugations 138 of one sheet running normally to the corrugations of the other sheet, so that they abut at a plurality of points on their crests. The peripheries 140 of the sheets 136 are sealed together with the sheets 136 in their plastic state, by coating them with methyl ethyl ketone solvent which acts as an adhesive, and pressing them together with a suitable pressure while heating them to a suitable temperature, e.g. 60° C., at which the polyvinyl-butyral is plastic. This pressing is so as to bond and seal said peripheries 140 of the two sheets 136 integrally together.

The green envelope so formed is then heated, initially to cure the polyvinyl-butyral/dibutyl phthalate mixture and set it, then to volatilize the binder, plasticizer and solvent, and finally to sinter the envelope into a unitary ceramic β"-alumina envelope, having a central opening provided by the openings 144, and an interior provided by the channels 142 and the grooves or valleys defined by the corrugations 138.

The crests of the corrugations 138 of the two sheets abut one another. The interior of the envelope so formed is accordingly relatively small in volume, but the entire interior surface of the envelope, except the points where the corrugations of the one sheet cross over and abut the corrugations of the other sheet, is available to be filled e.g. with molten sodium, which molten sodium is reliably and fully in communication via the channels 142 with the central openings 144, which form feedthrough for electrode (e.g. anode) material.

Finally, it should be noted that, although a number of envelope shapes and cells have been described with reference to envelopes having corrugated sheets whose corrugations cross over one another in accordance with the present invention, at least several of these envelope shapes and cell constructions can be employed for similar envelopes in which the sheets are flat or corrugated in a fashion in which the corrugations do not cross over one another. The present invention extends to these other envelope shapes and cell constructions as well.

We claim:

1. A laterally compressed envelope of solid electrolyte material for use as an electrode holder in an electrochemical cell, the envelope having a pair of opposed major faces sealed together along at least part of the periphery of the envelope, each major face being provided by a sheet of said solid electrolyte material and each sheet being provided on its inner surface with a plurality of ribs or corrugations extending alongside one another, each rib or corrugation of each said sheet crossing over a plurality of the ribs or corrugations of the other said sheet, the envelope having an internal volume, between the sheets, defined at least in part by grooves or valleys between the ribs or crests of the corrugations, and each part of said internal volume being in communication with each other part of said internal volume.

2. An envelope as claimed in claim 1, in which the ribs or corrugations of each sheet are parallel to one another, the ribs or corrugations of each sheet extending at an angle to the ribs or corrugations of the other sheet and the sheets being in face-to-face abutment with each other so that the ribs or crests of the corrugations of each sheet, where they cross over the ribs or crests of the corrugations of the other sheet, are in contact with said ribs or crests of the corrugations of the other sheet at a plurality of positions.

3. An envelope as claimed in claim 2, in which each sheet as a whole is corrugated so that both surfaces of each sheet are corrugated, the corrugations of each sheet being of the same shape and size and the corrugations of the sheets being arranged so that, at at least one edge of each sheet at the periphery of the envelope, the corrugations of each sheet cross over the corrugations of the other sheet at an acute angle of less than 45° and so that, at said edge, the corrugations of each sheet are in phase with the corrugations of the other sheet and nest face-to-face therein, the sheets being sealed to each other where this nesting takes place, and crossing said edge at an acute angle of at least 45°.

4. An envelope as claimed in claim 1, in which there is an opening into the interior of the envelope from the exterior thereof, to provide a feedthrough for electrode material for connection to a reservoir of electrode material.

5. An envelope as claimed in claim 1, which is joined to at least one further envelope of the same size and shape to form a composite electrode holder, the interiors of the envelopes of the composite holder being in communication.

6. An envelope as claimed in claim 5, in which the composite holder comprises a plurality of said envelopes arranged face-to-face and in register, each adjacent pair of envelopes being in communication with each other via an elongated slot centrally positioned in respective major faces thereof, the envelopes of said pair being joined together along the periphery of said slot.

7. An envelope as claimed in claim 5, in which the composite holder comprises at least three said envelopes which radiate, in circumferentially spaced fashion, from a central axis, each envelope having a slot along the radially inner edge thereof, the envelopes being joined together at the peripheries of said slots so that they communicate via said slots with a central enclosed space along which said axis extends.

8. An envelope as claimed in claim 1, which is curved about an axis.

9. An envelope as claimed in claim 8, in which said curve is a spiral curve.

10. An envelope as claimed in claim 1, which has an expanded portion where the sheets are spaced apart from each other to provide a reservoir for electrode material in the envelope.

11. A method of making a laterally compressed envelope of solid electrolyte material as claimed in claim 1, the method comprising the steps of:

formulating a mouldable mixture comprising the solid electrolyte material or a precursor thereof in a particulate form together with one or more binders which have both thermoplastic and setting properties;

forming the mixture into sheet material which is corrugated or has, on at least one side thereof, a ribbed surface;

forming the sheet material into a laterally compressed envelope having a pair of major faces formed from said sheet material, the inner opposed surfaces of the major faces being provided with said ribs or corrugations, each of the ribs or corrugations of the one sheet crossing over a plurality of the ribs or corrugations of the other sheet, and the major faces being sealed to each other along at least part of the periphery of the envelope; and treating the envelope to cure the setting binder or binders.

12. An electrochemical cell which comprises a cell housing defining an electrode compartment and, located within the electrode compartment, an electrode holder in the form of a laterally compressed envelope as claimed in claim 1, the interior of the holder forming another electrode compartment.

* * * * *